United States Patent [19]

Saito et al.

[11] 4,103,196

[45] Jul. 25, 1978

[54] CORELESS MOTOR

[75] Inventors: Yutaka Saito, Takatsuki; Youichi Yamamoto, Kyoto; Hajime Kojima, Hirakata, all of Japan

[73] Assignee: Matsushita Electric Works, Ltd., Japan

[21] Appl. No.: 843,038

[22] Filed: Oct. 17, 1977

Related U.S. Application Data

[63] Continuation-in-part of Ser. No. 615,116, Sep. 19, 1975, abandoned.

[51] Int. Cl.² ............................................. H02K 1/22
[52] U.S. Cl. .................................. 310/266; 310/154; 310/237
[58] Field of Search ............... 310/152, 154, 219, 207, 310/234–238, 267, 266

[56] References Cited

U.S. PATENT DOCUMENTS

| | | | |
|---|---|---|---|
| 2,553,292 | 5/1951 | Barrett | 310/237 X |
| 2,759,116 | 8/1956 | Glass | 310/266 X |
| 3,191,081 | 6/1965 | Faulhaber | 310/207 X |
| 3,209,187 | 9/1965 | Angele | 310/266 |
| 3,237,036 | 2/1966 | König | 310/266 |
| 3,308,319 | 3/1967 | Faulhaber et al. | 310/266 |
| 3,360,668 | 12/1967 | Faulhaber | 310/266 X |

Primary Examiner—Donovan F. Duggan
Attorney, Agent, or Firm—Leydig, Voit, Osann, Mayer & Holt, Ltd.

[57] ABSTRACT

A miniature coreless motor in which the coil of the rotor is wound in hollow cylindrical shape rotatable within an air gap between a cylindrical permanent magnet and a cup-shaped yoke, the yoke having pole-pitch zones of alternate polarity. The winding is wound progressively so as to be turned back alternately at the respective end edges to form axially re-entrant bends with the convolutions of the winding forming an inner layer of wire and an outer layer of wire, each convolution being made up of elements which are angularly related so that each convolution passes through pole-pitch zones of different polarity. The elements forming the inner and outer layers of wire cross one another at an angle to form a thin cylindrical two-ply construction in which the end edges are rigid and occupy parallel planes. One of the end edges has the axially-facing insulation superficially removed to expose a conductive surface at the outer periphery of each re-entrant bend. A pair of brushes of resilient spring metal provide localized axial contact with the exposed conductive surfaces of the winding at peripherally spaced points.

1 Claim, 10 Drawing Figures

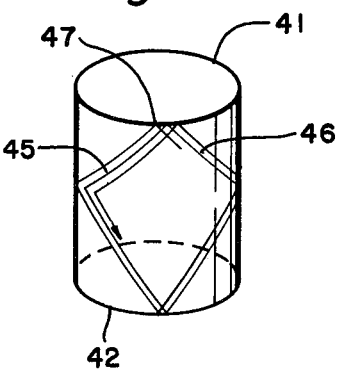
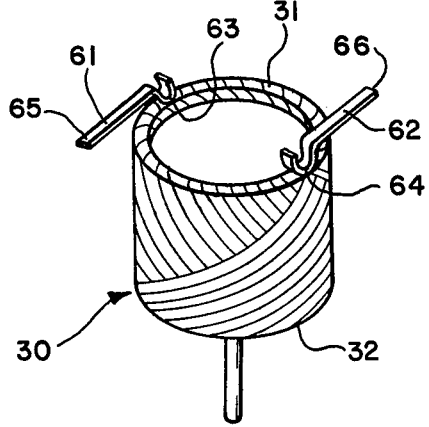
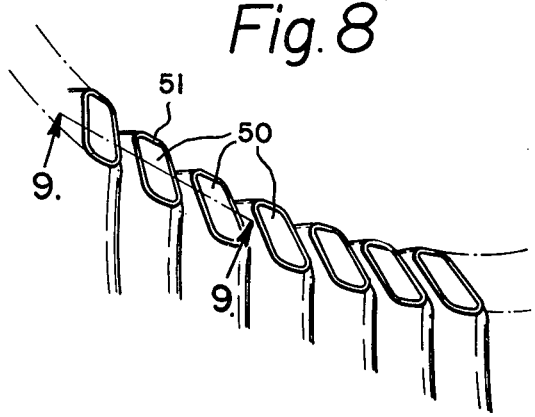
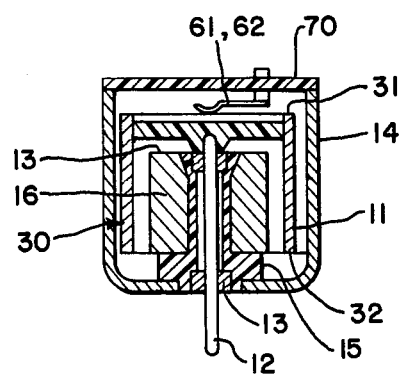
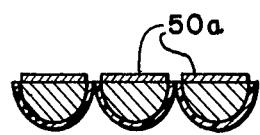

CORELESS MOTOR

This is a continuation-in-part of U.S. application Ser. No. 615,116, filed Sept. 19, 1975, now abandoned.

A "coreless" motor is one in which the motor winding does not encircle, or enclose, any magnetic core material. Such motors have presented intriguing possibilities because of their low inertia and susceptibility to miniaturization. Motors of this general type have been the subject of numerous patents including Faulhaber U.S. Pat. Nos. 3,191,081, which issued June 22, 1965; 3,308,319, which issued Mar. 7, 1967; and 3,360,668, which issued Dec. 26, 1967. A further example is to be found in Futterer U.S. Pat. No. 3,694,684, which issued Sept. 26, 1972. All of these patents showing "wound" coreless rotors have one thing in common: they require the making of a "pigtail" connection with selected convolutions of the motor winding for connection to a commutator, either by the bringing out of a "loop" or by the making of a connection to the selected turn by soldering or welding.

The bringing out of spaced loops is highly undesirable for quantity production purposes since this does not lend itself to automated winding. It has, on the contrary, been preferred, in automation of the winding process, to make a perfectly uniform repetitive winding, and to make connections to that winding as a later, manual operation. Such operation has included the steps of locating a selected turn, baring the insulation on such selected turn, and then either welding or soldering a connection to the individual turn. This obviously requires exercise of great care and patience, with hand labor making up a large element of the cost. More seriously, however, when a connection is made by either welding or soldering there is grave risk that the integrity of the insulation between the turns will be affected so that adjacent turns will be short-circuited resulting in an unacceptable rejection ratio. But the problem does not end there: The short circuiting may be incipient and only show up after the motor has been in operation for a period of time. Also, since the aim is to employ a minimum amount of heat in the bonding operation, the bond is not always secure and it is found that the resulting connection tends to work loose after a period of time making the motor inoperative. As a result, coreless motors have not been noted for their reliability. Moreover, currently used techniques require a certain minimum wire size which has severely limited the degree of miniaturization which can be achieved with this design.

In an effort to automate the production of coreless motors, it has been suggested in Angele U.S. Pat. No. 3,209,187, which issued on Sept. 28, 1965, that a two-ply printed circuit be used. This approach has a number of serious practical problems. One is that the number of turns must be severely limited and the turns must be made of relatively wide ribbon conductors to secure sufficient current carrying capacity. The small number of turns, for a given diameter of rotor, means that very little back e.m.f. per r.p.m. can be developed, thereby limiting such motors to low voltage operation. Moreover where the printed circuit itself is employed as the commutator, the wearing surface is so thin that the life of the unit is inherently limited. A further problem with such motors is the difficulty of establishing continuity of the conductor as it makes a bend at the cylindrical end edges so that such end edges are not suitable for the making of brush contact. Indeed printed circuits are not well suited for direct brush contact since the conductor, by reason of the method of manufacture, stands "on top of" the insulating support; thus there is insulation under the conductor but not in between adjacent conductors, which tends to cause the space between adjacent conductors rapidly to fill in with conductive dust and creating a short circuiting path. For these and other reasons, printed circuit motors are considered neither practical nor competitive in the miniature motor field.

Prior patents also exist showing toroidal motor windings wound about an annular magnetic core, with brushes in direct contact with the winding, an example being Barrett U.S. Pat. No. 2,553,292 which issued May 15, 1951. In the Barrett patent, and related patents, the winding is of rectangular cross section, as required to enclose the magnetic core, presenting an extensive flat end surface consisting of parallel runs of adjacent convolutions engaged by a flat brush which presents substantial area to the adjacent convolutions. In motors of the Barrett type efforts are made to make brush contact both flat and extensive and it is common for the brush to make simultaneous contact with, and thereby short circuit, as many as ten or a dozen adjacent convolutions. It may also be observed in Barrett and related patents employing cores (including patents directed toward auto transformers where direct brush contact is employed), that the winding not only encircles a core but the winding is stationary and it is the brushes which revolve.

It is, accordingly, an object of the invention to provide a miniature electric motor which overcomes the disadvantages of prior motors of this type which may be economically manufactured using high production techniques, which has reliability which surpasses motors of conventional design, and in which there is no inherent limitation to the degree of miniaturization which can be achieved.

It is a more specific object of the invention to provide a motor having a coreless armature which is formed of a two-ply winding, wound progressively so that the elements of the inner and outer layers cross one another at an angle to provide rigid end edges occupying parallel planes, with one of the end edges having the axially facing insulation superficially removed to expose a series of conductive surfaces with which a pair of brushes provide localized axial contact. Thus it is an object to provide a coreless armature which avoids use of the usual commutator having segments connected to wires brought out of the winding pigtail fashion or wires which require welding or soldering to selected ones of adjacent winding convolutions.

It is, therefore, an object of the invention to provide a miniature coreless motor which is ideally suited to high production techniques, in which the winding consists of purely repetitive convolutions which can be wound at high speed, and in which there is no necessity for manual labor required to remove insulation from individual selected turns, or to make reliable individual contact with such turns by soldering or welding, or to exercise extreme care to keep the heat level below that which will degrade the insulation to the point where actual or potential short circuiting contact is made with the adjacent turns.

It is a further and important object of the present invention to provide a two-ply winding of the above mentioned type in which resilient brushes provide axial contact with the exposed axial edge of the winding at peripherally spaced points and in which the brush contact is exerted primarily upon single convolutions thus enabling adequate contact with extremely light pressure and minimum frictional drag. By reason of the fact that the brushes engage the axial ends of adjacent winding convolutions, and since the voltage differential between adjacent winding convolutions is extremely small, commutation may take place without sparking or generation of heat, thereby minimizing erosion of either the winding turns or the brush, avoiding the heat which might draw temper, and making possible the use of brushes in the form of light metallic springs. In this connection it is an object to provide a commutation system which, in spite of its elemental simplicity, is long-lived, even in the face of overload. Moreover, efficiency is high, not only because of the localized contact and light bearing pressures which may be used, but also since there is an almost unlimited number of contact segments, with each turn of fine wire each acting as its own commutator segment.

Other objects and advantages will be apparent from reading the attached detailed description and upon reference to the drawings in which:

FIGS. 5 and 6 are corresponding views showing an alternate form of winding.

FIG. 7 illustrates, in perspective, a rotor and associated brushes constructed in accordance with the invention.

FIG. 8 shows a greatly enlarged fragment of the end edge engaged by the brushes.

FIG. 9 is a fragmentary section looking along line 9—9 in FIG. 8 and showing the use of wear-resistant plating.

FIG. 10 is an axial section taken through a motor constructed in accordance with the invention.

While the invention has been described in connection with a preferred embodiment, it will be understood that we do not intend to limit the invention to the particular embodiment shown but intend, on the contrary, to cover the various alternative and equivalent forms of the invention included within the spirit and scope of the appended claims.

Figure 1:
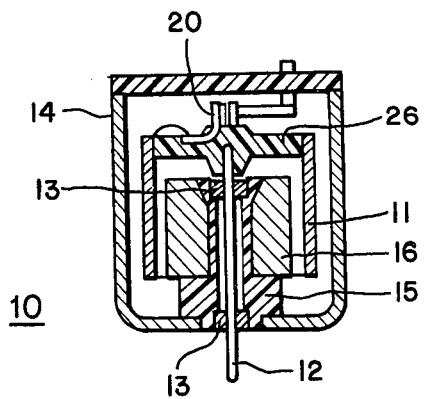
FIG. 1 is an axial section showing a motor which is typical of the prior art.
Figure 2:
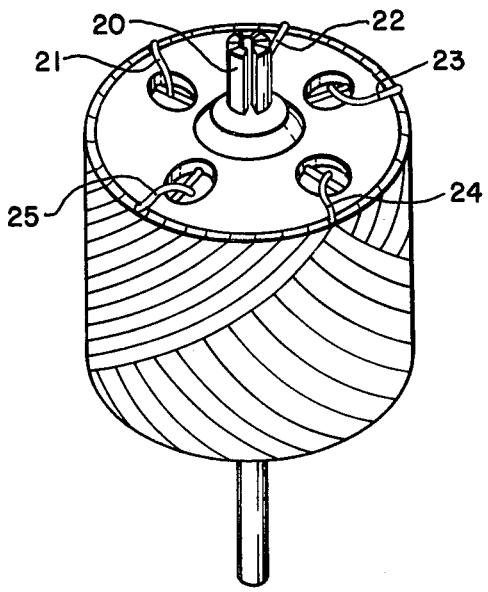
FIG. 2 is a perspective view of the rotor used in the construction of FIG. 1.

Turning now to FIGS. 1 and 2 there is shown, at 10, an electric motor constructed in accordance with prior art teachings employing a cup-shaped coreless rotor 11 having a shaft 12. The shaft is journaled in bearings 13 provided in a cup or yoke 14 drawn of magnetic material. Supported centrally within the cup 14, upon an annular pedestal 15, is an annular permanent magnet 16 which is so magnetized as to present pole pitch zones of alternate polarity equally spaced about its outer surface. Prior constructions are characterized by the use of a commutator 20 (FIG. 2), the segments of which are connected by respective wires 21–25 to individual convolutions of the rotor winding spaced at equal angular intervals, the commutator being supported on an insulated disc 26. The number of wires 21–25 corresponds to the number of peripherally spaced poles on the permanent magnet 16.

The wires 21–25, connected to the commutator segments, may be connected to the rotor winding in one of two ways, both in common usage: The first way is to extend a winding convolution to provide a pigtail loop as shown, for example, in prior U.S. Pat. No. 3,360,668. The alternative is to solder or weld, to individual convolutions of a winding, tapped connections. It is the purpose of the present invention to disclose an improvement which avoids both pigtail loops and tapped connections.

Figure 3:
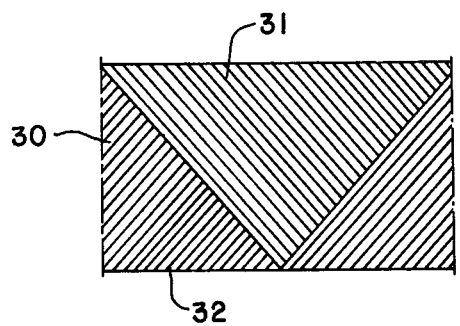
FIGS. 3 and 4 show respectively, in a "developed" view and in a schematically perspective view, the nature of the winding used in the present invention.
Figure 4:
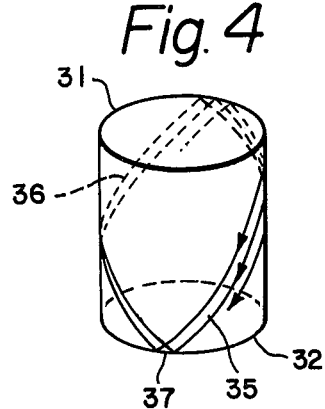

Prior to discussing the invention in detail, reference may be made to FIGS. 3 and 4 which show a typical form of winding to which the present invention is applicable. The winding, indicated at 30 in FIG. 3, consists of adjacent convolutions wound progressively so as to be turned back alternately at respective end edges 31, 32. A typical complete convolution is illustrated in FIG. 4 comprising a first diagonal element 35 and a second diagonal element 36, the elements being joined at the end edge by re-entrant bend 37. Since the convolutions of the winding are wound progressively, the elements are angularly related so that each convolution passes through pole pitch zones of different polarity. The elements extend from end to end at approximately 180° intervals so that they cross one another orthogonally, or at a large angle, to form a thin right cylinder of two-ply construction in which the end edges 31, 32 are rigid.

Figure 5:
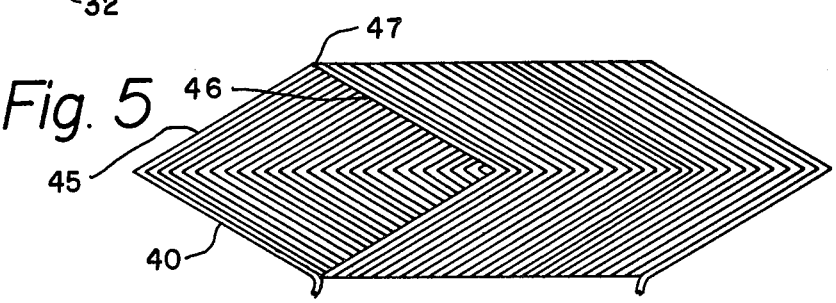

There is shown in FIGS. 5 and 6 another specific form of winding to which the present invention is applicable and in which the convolutions are wound progressively in rhombic form. The winding, indicated generally at 40, has end edges 41, 42 which lies in parallel planes, with a typical convolution having an outer element 45 and in inner element 46 which are angularly related and which pass through pole-pitch zones of different polarity, the elements of the convolution being interconnected by a re-entrant bend 37.

To summarize, the invention is practiced employing a winding consisting of convolutions which are wound progressively so as to be turned back alternately at the respective end edges to form a two-ply construction, with each convolution having elements which are angularly related and which are joined by a re-entrant bend, and with the elements forming inner and outer layers crossing one another at an angle to form a two-ply construction in which the end edges are rigidly braced with respect to one another.

In accordance with the present invention one of the end edges of such a winding has the axially-facing insulation superficially removed to expose a conductive surface at the outer periphery of each re-entrant bend, and a pair of brushes of resilient spring metal are provided having localized axial contact with the exposed conductive surfaces of the winding at peripherally spaced points on the end edge for feeding current to the winding. Thus referring to FIG. 7 a winding 30, distinguished by the two-ply construction and rigid end edges 31, 32 has the insulation superficially removed at end edge 31 to provide individual conductive surfaces 50 at each re-entrant bend. The insulation 51 which normally covers the wire may be any type of thin, relatively hard, adherent insulation, for example a so-called "enamel" or equivalent plastic coating. It is one of the features of the invention that the insulation is removed only "superficially" that is removed only at the axial crown of each bend, leaving the insulation between adjacent convolutions intact so that there is no possibility of a short circuit occurring between adjacent convolutions. The insulation may be removed by superficial grinding operation which is carried to a sufficient degree to expose an appreciable area of each conductor without, however, extending so deeply as to substantially reduce the cross-sectional area of each conductor at the point of bend. Thus in no event should the grinding exceed the half-way point.

It is one of the features of the invention that retention of the insulation between the conductive surfaces of adjacent convolutions prevents the regions between the conductive surfaces from filling in with conductive dust as a result of extensive usage. As an optional step the conductive services 50 may be provided with a layer of wear-resistant material 58 as illustrated in FIG. 9. It will be understood, in viewing this figure, that the thickness of the wear-resistant material has been greatly exaggerated. In the practical case a nickel plating may be employed to a thickness of about 7 microns covered by a second or normal metal to a thickness of about 3 microns, the latter, for example, being palladium, gold or rhodium or their alloys. The plating serves not only to reduce wear but also to minimize and stabilize contact resistance.

In carrying out the present invention the brushes are made of resilient spring metal bearing axially against the conductive services at the end edge of the winding. In FIG. 7 there is illustrated a pair of brushes 61, 62 which are made of light gauge resilient spring metal having contact portions 63, 64 and cantilver-supported at ends 65, 66. The ends of the spring brushes are preferably anchored in an insulated end cap shown at 70 in FIG. 10, the end cap enclosing the cup or yoke 14, the brushes being pre-stressed to apply force in the axial direction.

The remaining elements illustrated in FIG. 10, where applicable, have identifying reference numerals corresponding to FIG. 1.

It is found that where the tips of the brushes are constructed to provide localized engagement, concentrated primarily upon the conductive surface of a single winding convolution, good reliable contact may be achieved using forces which are much lighter than those normally exerted by brushes in motors of conventional design. Because of the small voltage differential which exists between adjacent convolutions, and because of the localized contact, motors employing the present invention evidence substantially no sparking, and contact resistance is sufficiently low so that there is only negligible generation of heat even though operated continuously at rated load. Accordingly, there is no temperature build-up and therefore no possibility that the temperature of the brush elements will rise to a level which might have the effect of withdrawing the temperature or degrading the insulation between the turns.

The invention is ideally suited to quantity production since the windings of the type illustrated in FIGS. 3-6 consist of repetitive and progressive convolutions well suited to automated procedures without necessity for interrupting the sequence to bring out loops or other pigtail connections. The insulation is superficially removed to create the series of conductive surfaces at the re-entrant bends simply by touching the rigid end edge of the winding lightly to a fine-grained abrasive surface, without any attention being given to baring of individual turns. Since the grinding step is a "gross" operation it also lends itself well to automation. Obviously, then, the present invention permits a high degree of economy in the manufacture of motors of the coreless type and there is no necessity for the time consuming hand work of locating, and making contact with, individual convolutions for the purpose of connecting such convolutions to a commutator. More importantly, however, the present procedures raise the possibility of near-perfect reliability, both at the time that the motor is produced and following extensive usage since there is no necessity for application of heat to damage insulation, giving risk of short circuit, nor is there any possibility that a welded or soldered connection will become disconnected to cause catastrophic failure during the life of the device.

Effectively, the present invention utilizes each convolution as a commutator so that several hundred poles, as opposed to the conventional five or seven poles, are employed which enhances the efficiency. Actual measurement of a 200 pole motor demonstrates a 6.5% gain in torque over a five pole motor with the same number of windings.

Since there is no need to give attention to individual turns, extremely fine wire may be employed and miniaturization may be carried to a greater degree than has been possible in the past.

We claim as our invention:

1. A miniature coreless motor comprising a stator including a cylindrical yoke and permanent magnet centrally positioned in said yoke providing an annular air gap between the magnet and the yoke having pole-pitch zones of alternate polarity, a cylindrical rotor comprising an insulated coil winding mounted rotatably within the annular air gap, the convolutions of the winding being wound progressively so as to be turned back alternately at the respective end edges to form axially re-entrant bends, with the convolutions of the winding forming an inner layer of wire and an outer layer of wire, each convolution being made up of elements which are angularly related so that each convolution passes through pole-pitch zones of different polarity, the elements forming the inner and outer layers crossing one another at an angle to form a thin cylindrical two-ply construction in which the end edges are rigid and occupy parallel planes, one of the end edges having the axially facing insulation superficially removed to expose a conductive surface at the outer periphery of each re-entrant bend, and a pair of brushes of resilient spring metal providing localized axial contact with the exposed conductive surfaces of the winding at peripherally spaced points on the one end edge for feeding electric current to the winding.

* * * * *